United States Patent
Zhang et al.

(10) Patent No.: US 11,106,831 B2
(45) Date of Patent: Aug. 31, 2021

(54) METHOD AND DEVICE FOR MANAGING STORAGE SYSTEM

(71) Applicant: EMC IP Holding Company LLC, Hopkinton, MA (US)

(72) Inventors: Lester Zhang, Beijing (CN); Chen Gong, Beijing (CN); Leon Zhang, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 320 days.

(21) Appl. No.: 15/954,794

(22) Filed: Apr. 17, 2018

(65) Prior Publication Data

US 2018/0300508 A1 Oct. 18, 2018

(30) Foreign Application Priority Data

Apr. 17, 2017 (CN) .......................... 201710250201.0

(51) Int. Cl.
*G06F 21/78* (2013.01)
*G06F 12/02* (2006.01)
(Continued)

(52) U.S. Cl.
CPC .......... *G06F 21/78* (2013.01); *G06F 12/0238* (2013.01); *G06F 21/6227* (2013.01);
(Continued)

(58) Field of Classification Search
CPC .. G06F 21/78; G06F 12/0238; G06F 21/6227; G06F 2212/1052; G06F 2212/402; G09C 1/00; H04L 9/0877
See application file for complete search history.

(56) References Cited

U.S. PATENT DOCUMENTS 8,751,828 B1 6/2014 Raizen et al.
9,152,353 B1 * 10/2015 Wang .................... G06F 3/0665
(Continued)

FOREIGN PATENT DOCUMENTS

| CN | 102598019 | 7/2012 |
|---|---|---|
| CN | 102724302 | 10/2012 |
| CN | 202563493 | 11/2012 |

OTHER PUBLICATIONS

Da et al "Storage Allocation Methods, Storage Size and Service Level Under Certainty in Manual Order Picking Systems," 2010 International Conference on E-Business and E-Government, pp. 3283-3289 (Year: 2010).*

*Primary Examiner* — Luu T Pham
*Assistant Examiner* — James J Wilcox
(74) *Attorney, Agent, or Firm* — BainwoodHuang

(57) ABSTRACT

Implementations of the present disclosure relate to method and device for managing a storage system. The method comprises in response to receiving a write request at a storage system, determining whether storage units allocated to a logic storage unit of the storage system are sufficient for data associated with the write request. The method also comprises in response to determining that the allocated storage units are insufficient, allocating a new storage unit to the logic storage unit. The method further comprises updating metadata associated with allocation of the storage units of the storage system, the metadata indicating a mapping between the logic storage unit and the storage units. The method also comprises encrypting the updated metadata. Other implementations of the present disclosure also involve corresponding method, device and computer-readable medium for decryption metadata and recovering the logic storage unit using the decrypted metadata.

20 Claims, 10 Drawing Sheets

(51) Int. Cl.
*G09C 1/00* (2006.01)
*G06F 21/62* (2013.01)
*H04L 9/08* (2006.01)

(52) U.S. Cl.
CPC .............. *G09C 1/00* (2013.01); *H04L 9/0877* (2013.01); *G06F 2212/1052* (2013.01); *G06F 2212/402* (2013.01)

(56) References Cited

U.S. PATENT DOCUMENTS

| | | | |
|---|---|---|---|
| 9,262,424 B1 | 2/2016 | Si et al. | |
| 9,401,226 B1* | 7/2016 | Shin | G11C 11/1653 |
| 9,558,068 B1* | 1/2017 | Bono | G06F 11/00 |
| 9,576,012 B2* | 2/2017 | Zhang | G06F 16/2282 |
| 9,846,544 B1* | 12/2017 | Bassov | G06F 3/0665 |
| 9,881,016 B1* | 1/2018 | Bono | G06F 16/1744 |
| 9,933,945 B1 | 4/2018 | Mao et al. | |
| 10,146,703 B1 | 12/2018 | Bono et al. | |
| 10,824,361 B2* | 11/2020 | Sun | G06F 11/1092 |
| 10,901,949 B2* | 1/2021 | Zhao | G06F 3/0643 |
| 2005/0273858 A1* | 12/2005 | Zadok | G06F 21/56 726/24 |
| 2006/0080553 A1* | 4/2006 | Hall | G06F 21/6227 713/189 |
| 2009/0037499 A1* | 2/2009 | Muthulingam | G06F 3/0674 |
| 2010/0125598 A1* | 5/2010 | Lango | G06F 16/10 707/769 |
| 2012/0266011 A1* | 10/2012 | Storer | G06F 11/1092 714/1 |
| 2013/0132733 A1* | 5/2013 | Agrawal | G06F 21/10 713/189 |
| 2014/0244897 A1* | 8/2014 | Goss | G06F 12/0238 711/103 |
| 2015/0058547 A1* | 2/2015 | Thatcher | G06F 3/0626 711/103 |
| 2015/0121468 A1* | 4/2015 | Park | H04W 48/02 726/4 |
| 2016/0301752 A1* | 10/2016 | Botes | G06F 3/0661 |
| 2017/0041296 A1* | 2/2017 | Ford | G06F 16/951 |
| 2017/0255636 A1* | 9/2017 | Chun | G06F 3/0608 |
| 2017/0289250 A1* | 10/2017 | Baptist | G06F 3/061 |
| 2018/0365141 A1* | 12/2018 | Dragojevic | G06F 12/0246 |

\* cited by examiner

METHOD AND DEVICE FOR MANAGING STORAGE SYSTEM

RELATED APPLICATIONS

This application claim priority from Chinese Patent Application Number CN201710250201.0, filed on Apr. 17, 2017 at the State Intellectual Property Office, China, titled "METHOD AND DEVICE FOR MANAGING STORAGE SYSTEM" the contents of which is herein incorporated by reference in its entirety.

FIELD

Embodiments of the present disclosure generally relate to the field of storage management, and more specifically, to a method and system for managing a storage system.

BACKGROUND

As the data storage technology develops, various data storage devices have already provided an increasingly higher data storage capacity for users, and the data access speed is also improved to a large extent. At present, a variety of data storage systems based on RAID (redundant array of independent disks) have been developed to enhance data reliability. Such disk array, which is implemented by combining a large number of raw disks, can provide a reliable and stable storage system for users based on redundant storage and parallel access. This storage system usually occupies a great amount of CPU processing overheads as it needs to manage data access on a plurality of disks simultaneously.

Meanwhile, security performance becomes more and more important in the modern IT organization architecture. In most cases, data on the disk should be encrypted to avoid data loss result from missing of important data and/or stolen physical disks. The traditional data encryption method needs to encrypt all user data written into the disk in real time or in non-real time, and such process costs a huge amount of computations and occupies a great amount of CPU processing overheads, thereby lowering the performance of the system.

SUMMARY

In a first aspect of the present disclosure, there is provided a method for managing a storage system. The method comprises: in response to receiving a write request at the storage system, determining whether storage units allocated to a logic storage unit of the storage system are sufficient for data associated with the write request, the storage system being used for allocating a plurality of storage units to a logic storage unit and providing the logic storage unit to a user; in response to determining that the allocated storage units are insufficient, allocating a new storage unit to the logic storage unit; updating metadata associated with allocation of the storage units of the storage system, the metadata indicating a mapping between the logic storage unit and the storage units; and encrypting the updated metadata.

In some embodiments, the updated metadata is encrypted by using information associated with a hardware component of the storage system as an encryption key.

In some embodiments, the updated metadata is encrypted by using an identifier of a mainboard of the storage system as an encryption key.

In some embodiments, the metadata indicates at least one of: a storage unit map entry, a storage unit mark, file system information and a storage unit allocation table.

In a second aspect of the present disclosure, there is provided a method for managing a storage system. The method comprises: in response to a request for initializing a logic storage unit, initiating mounting of a plurality of storage units allocated to the logic storage unit, the storage system being used for allocating the plurality of storage units to the logic storage unit and providing the logic storage unit to a user; reading metadata associated with allocation of the storage units of the storage system, the metadata indicating a mapping between the logic storage unit and the plurality of the storage units; decrypting the read metadata; and recovering the logic storage unit using the decrypted metadata.

In some embodiments, the read metadata is decrypted by using information associated with a hardware component of the storage system as a decryption key.

In some embodiments, the updated metadata is decrypted by using an identifier of a mainboard of the storage system as a decryption key.

In some embodiments, the metadata comprises a plurality of data items and in response to determining at least one of the plurality of data items being incorrect, selecting a correct data item from the plurality of data items based on a voting mechanism.

In some embodiments, the metadata is selected from one of: a storage unit map entry, a storage unit mark, file system information and a storage unit allocation table.

In a third aspect of the present disclosure, there is provided an electronic device, comprising: at least one processor; and a memory coupled to the at least one processor, the memory comprising instructions stored thereon, which, when executed on the at least one processor, cause the device to perform acts comprising: in response to receiving a write request at the storage system, determining whether storage units allocated to a logic storage unit of the storage system are sufficient for data associated with the write request, the storage system being used for allocating a plurality of storage units to a logic storage unit and providing the logic storage unit to a user; in response to determining that the allocated storage units are insufficient, allocating a new storage unit to the logic storage unit; updating metadata associated with allocation of the storage units of the storage system, the metadata indicating a mapping between the logic storage unit and the storage units; and encrypting the updated metadata.

In a fourth aspect of the present disclosure, there is provided an electronic device, comprising: at least one processor; and a memory coupled to the at least one processor, the memory comprising instructions stored thereon, which, when executed on the at least one processor, cause the device to perform acts comprising: in response to receiving a write request at the storage system, determining whether storage units allocated to a logic storage unit of the storage system are sufficient for data associated with the write request, the storage system being used for allocating a plurality of storage units to a logic storage unit and providing the logic storage unit to a user; in response to determining that the allocated storage units are insufficient, allocating a new storage unit to the logic storage unit; updating metadata associated with allocation of the storage units of the storage system, the metadata indicating a mapping between the logic storage unit and the storage units; and encrypting the updated metadata.

In a fifth aspect of the present disclosure, there is provided a computer-readable storage medium. The computer-readable storage medium has computer-readable program instructions stored thereon, which computer-readable program instructions, when executed on a processing unit, cause the processing unit to perform the method described according to the first aspect of the present disclosure.

In a sixth aspect of the present disclosure, there is provided a computer-readable storage medium. The computer-readable storage medium has computer-readable program instructions stored thereon, which computer-readable program instructions, when executed on a processing unit, cause the processing unit to perform the method described according to the second aspect of the present disclosure.

The Summary is to introduce a selection of concepts in a simplified form that are further described below in the Detailed Description. This Summary does not intend to identify key features or essential features of the present disclosure, nor to limit the scope of the claimed subject matter.

BRIEF DESCRIPTION OF THE DRAWINGS

Features, advantages and other aspects of the present disclosure will become more apparent from the following detailed description with reference to the accompanying drawings. Several implementations of the present disclosure will be illustrated by way of example but not limitation. Like reference signs usually refer to like component in the drawings. In the drawings.

DETAILED DESCRIPTION OF EMBODIMENTS

Preferred implementations of the present disclosure will be described in details with reference to the drawings. Although the drawings only illustrate the preferred implementations of the present disclosure, it should be appreciated that the present disclosure can be implemented by various manners and is not intended to be limited to the implementations illustrated herein. Instead, these implementations are provided for a more thorough and complete version of the present disclosure, so as to fully convey the scope of the present disclosure to those skilled in the art.

As used herein, the term "comprise" and its variants are to be construed as open-ended terms that mean "comprise, but is not limited to." The term "or" is to be construed as "and/or" unless the context clearly indicates otherwise. The term "based on" is to be construed as "based at least in part on." The terms "an example embodiment" and "an embodiment" are to be construed as "at least one example embodiment." The term "another embodiment" is to be construed as "at least one further embodiment." The terms "first" and "second" can represent different or same objects. The following text may also comprise other explicit and implicit definitions.

As described above, traditional disk data encryption method needs to encrypt all user data written into the disk in real time or in non-real time, and this process costs a huge amount of computations, which are usually time-consuming, thereby lowering the performance of the system.

To at least partially solve the above problem and one or more of other potential problems, example embodiments of the present disclosure propose a solution for managing a storage system. In this solution, instead of encrypting all user data on the disk, only metadata that may reflect an allocation process of allocating storage units to logic storage units are selected for encryption. Due to limited amount of such metadata, this solution can implement lightweight encryption process without influencing system performance. Besides, information associated with hardware components of the storage system can also be selected as an encryption key to further enhance data security.

Figure 1:
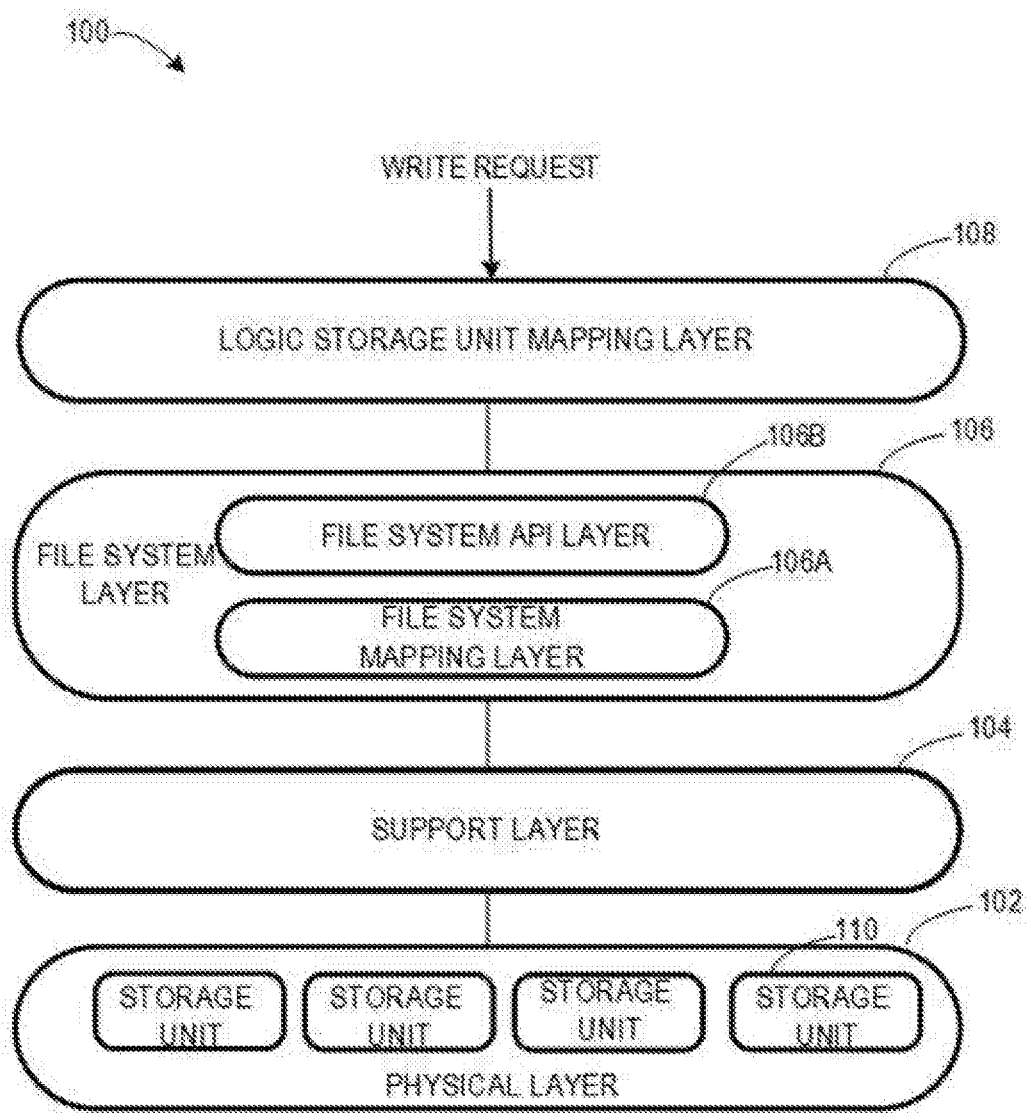
FIG. 1 illustrates a schematic diagram of an internal logic structure of a storage system 100 according to some embodiments of the present disclosure.

FIG. 1 illustrates a schematic diagram of internal logic structure of a storage system 100 according to some embodiments of the present disclosure. It should be understood that structure and function of the storage system 100 shown in FIG. 1 are only for the purpose of illustration without suggesting any limitations on the scope of the present disclosure. Embodiments of the present disclosure can be implemented in different structures and/or functions.

As shown in FIG. 1, the lowermost layer in the structure is known as a physical layer 102. For the entire storage system, the lowermost layer is embodied externally and physically as a physical disk array, which is formed by a plurality of raw disks. Each of the disks is split into a plurality of chunks, wherein each chunk corresponds to one storage unit 110 in the present disclosure. In some embodiments, the storage unit 110 can be referred to as "slice". In the context of the present disclosure, the terms "storage unit" and "slice" can be used interchangeably for ease of discussion. In some embodiments, the storage unit 110 can have a continuous memory space and optionally have the same size. For example, in some embodiments, the same size is 256 MB. It is noted that the above size is only an example, which is not intended for limiting the scope of the present disclosure in any manner.

A plurality of such storage units implements the function of an independent disk redundant array (RAID) in the storage system of the present disclosure. In a storage system, such as RAID, a plurality of storage devices (e.g., hard disk or solid-state storage device (SSD)) can be combined to form a disk array. By providing redundant storage, reliability of the entire storage system can significantly exceed a single storage device. Besides, the storage system can improve fault tolerance of the system and increase data throughput or data capacity etc. In the present disclosure, a plurality of such storage units 110 from the different disks of the disk array can be mapped or abstracted level-by-level by the storage system 100, encapsulated into a separate logic storage unit (logic disk/logic volume) and then provided for users.

Aggregated one layer upward, the physical layer 102 goes to support layer 104, which is also known as sparse volume layer. The support layer 104 is responsible for providing support of allocating/removing the storage units 110 for the layers above (comprising file system layer 106 and logic storage unit mapping layer 108). The allocating and removing process is performed dynamically and in real time during usage based on user's requirements, which will be explained in details in the following. When the storage system 100 is operating, the process of allocating storage units to logic storage units is controlled by the support layer 104, which combines a plurality of storage units (e.g., slices) of multiple physically independent storage devices (e.g., disks) into a logic storage unit having continuous address space.

In the above process, the support layer 104 needs to update metadata that reflects the allocation process of the storage units 110 while allocating or removing the storage units 110 for the logic storage unit, so as to record the latest allocation status.

Metadata is descriptive information concerning organization/attribute of the data and the relationship between the data. In brief, metadata is data that describes data. Metadata is different from the user data contained in the file that is written into the disk by users. Instead, metadata is associated with internal structure, mapping, organizational manner and structure of the file system. Besides, the metadata, which is created along with the establishment of storage space and file system, can be used for managing and describing details of storage space structure and file system structure within the disk array. Based on the metadata, user and the storage device can be aware of the manage manner of the storage space and the file system, and the storage space and the file system of the storage system can be recovered by means of the metadata.

Whenever the storage system 100 allocates a new storage unit 110 for the logic storage unit, the metadata is updated. The mapping from the physical layer 102 to the support layer 104 is coarse-grained, so the amount of metadata reflecting the above allocation process is relatively small.

The layer above the support layer 104 is a file system layer 106, which is also known as a universal block file system, being a main component of the storage system 100. It can be regarded as a log-based or record-based file system and can provide a central mapping logic for the implementation of the logic storage unit mapping layer 108. The interior of the file system layer 106 can also be divided into a file system API layer 106B and a file system mapping layer 106A, wherein the file system layer 106 mainly provides a mapping between the logic storage unit mapping layer 108 and the physical layer 102. Similar to other file systems, the file system layer 106 provides a mapping between the logic storage address and the physical storage address to a file. When an application writes data into the file, the file system allocates physical storage to store the written data and tracks the mapping from the logic address of the file to the physical storage address of the data, wherein the file system layer 106 can provide page management or block management at the level of 8 KB, for example. That is, the provided mapping from the physical storage address to the file is fine-grained, comparing with the support layer 104. As the specific implementation of the interior of the file system layer 106 is relatively complicated and not so close to the solution of the present disclosure, the details will not be given here. It should be noted that all values described herein are exemplary and not intended for limiting the scope of the present disclosure in any manner.

Similar to the support layer 104, the file system layer 106 also has metadata reflecting the internal mapping therein. Because the file system layer 106 performs a fine-grained mapping, the metadata that correspondingly reflects the internal mapping of the file system layer 106 is more complicated than the metadata of the support layer 104, not only huge in data amount but also more complex in storage positions.

The uppermost layer of the storage system 100 is a logic storage unit mapping layer 108. From the perspective of external users, the entire storage system 100 provides to user an abstract logic storage unit (logic disk/logic volume). The logic storage unit mapping layer 108 provides an interface for accessing the logic storage unit or the storage system 100. For example, the layer can receive a write request to the logic storage unit sent by a host of the user, and send commands associated with the write request to each layer in the storage system 100 to perform operations related to the write request.

Based on the above described internal logic structure of the storage system 100, a multi-layer logic mapping can be implemented from a physical layer 102 (storage hardware) at the bottom to a logic storage unit mapping layer 108 at the top. According to the multi-layer logic mapping, a RAID-based storage system with higher reliability and greater data throughput can be provided for the user, and the user does not need to be concerned about or aware of how the interior is implemented.

Figure 2:
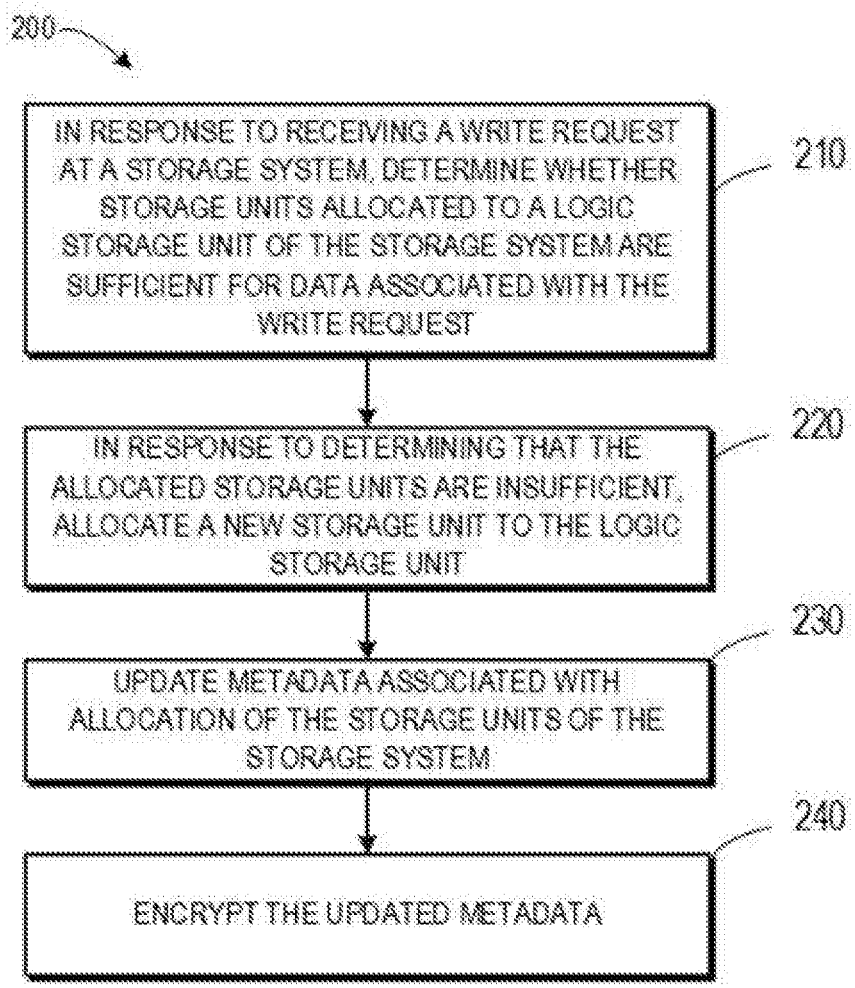
FIG. 2 illustrates a flow block diagram of a method 200 for managing a storage system according to some embodiments of the present disclosure.

FIG. 2 illustrates a flow block diagram of a method 200 for managing a storage system according to some embodiments of the present disclosure. The actions involved in the method 200 will be described below with reference to the schematic diagram of the internal logic structure of the storage system 100 shown in FIG. 1. At block 210, the storage system 100 receives a write request, which is sent by the user and indicates to write a predetermined size of data into a logic storage unit. The write request is received by the logic storage unit mapping layer 108 and will cause corresponding operations at each layer in the storage system 100. The write request can be, for example, a write operation to files stored within the logic storage unit, a copy operation of copying external user data into the logic storage unit, and an operation of reading or transmitting the external user data into the logic storage unit and the like. The write request can also comprise other appropriate operations adopted by those skilled in the art and the scope of the present disclosure is not limited in this regard.

At block 220, the storage system 100 determines whether the storage unit 110 that has already been allocated to the logic storage unit of the storage system is sufficient for data associated with the write request. The determination can usually be performed by comparing the total data amount comprised in the write request with the available storage space that has already been actually allocated to the logic storage unit by the storage system 100. If it is determined that the available storage capacity of the currently allocated storage units 110 satisfies the demand of the write request, the storage system 100 will perform the write operation directly and return a response after completion. If it is determined that the available storage capacity of the currently allocated storage unit 100 is insufficient for the demand of the write request, the storage system will allocate new storage unit(s) 110 to the logic storage unit.

Inside the storage system 100, the process of allocating the storage unit(s) 110 to the logic storage unit is dynamically performed and the allocation occurs at any time according to the actual use requirement of the user. Specifically, for example, the storage system 100 initially provides a logic storage unit (e.g., C disk) with a nominal size of 10 G, and the storage system 100 does not actually allocate a disk storage space of the nominal capacity size to the user time at the beginning because the user need not use that much storage capacity at first. In fact, the storage system 100 only needs to allocate a small number of storage units 110 (such as 1 to 2 storage units) to the user at the beginning and fills them in the support layer 104 to satisfy the current use requirements of the user. Then, when the user continuously writes data into the logic storage unit, the storage system 100 needs to determine whether the storage units 110 that have already been allocated to the logic storage unit satisfies the requirements or not. If yes, write operation is performed directly; and if not, the support layer 104 will continuously extract storage units 110 as required and add them to the logic storage unit. For example, in one embodiment, the storage unit 110 has a fixed size of 256 MB; accordingly, if the storage system 100 determines that the currently allocated storage unit 110 is insufficient when performing the write operation, it will require the support layer to extract a next storage unit 100 from the physical layer to fill into the support layer 104, so as to allocate to the logic storage unit. The storage system 100 continues to perform the operation of writing data and discover again that the currently allocated storage units 110 is insufficient for completing the write request after completing of writing 256 MB of data. Therefore, the storage system 100 will allocate the next storage unit 110 to the logic storage unit to provide new write space. Those skilled in the art can understand that the storage system 100 may also remove the storage unit 110 from the logic storage unit according to the subsequent actual use of the storage system 100 and release the removed storage unit 110 for reallocation.

Thus, according to the above description, when the storage system 100, at block 220, determines that the storage unit associated with the current write request is insufficient, the support layer 104 in the storage system 100 will continuously allocate appropriate number of storage units 110 to the logic storage unit, based on the data amount associated with the current write request, until this write request is completed.

According to the above description of the storage system 100, the support layer 104 needs to update the particular metadata reflecting allocation information of the storage units 110 while the storage units 110 are allocated to or removed from the logic storage unit, to record the latest allocation status of the storage units 110. Therefore, the storage system 100 will update, at block 230, metadata associated with storage unit allocation in the storage system 100, the metadata comprises information associated with allocation of the storage units 110, which can reflect the mapping between the logic storage unit and a plurality of storage units 110.

Figure 3:
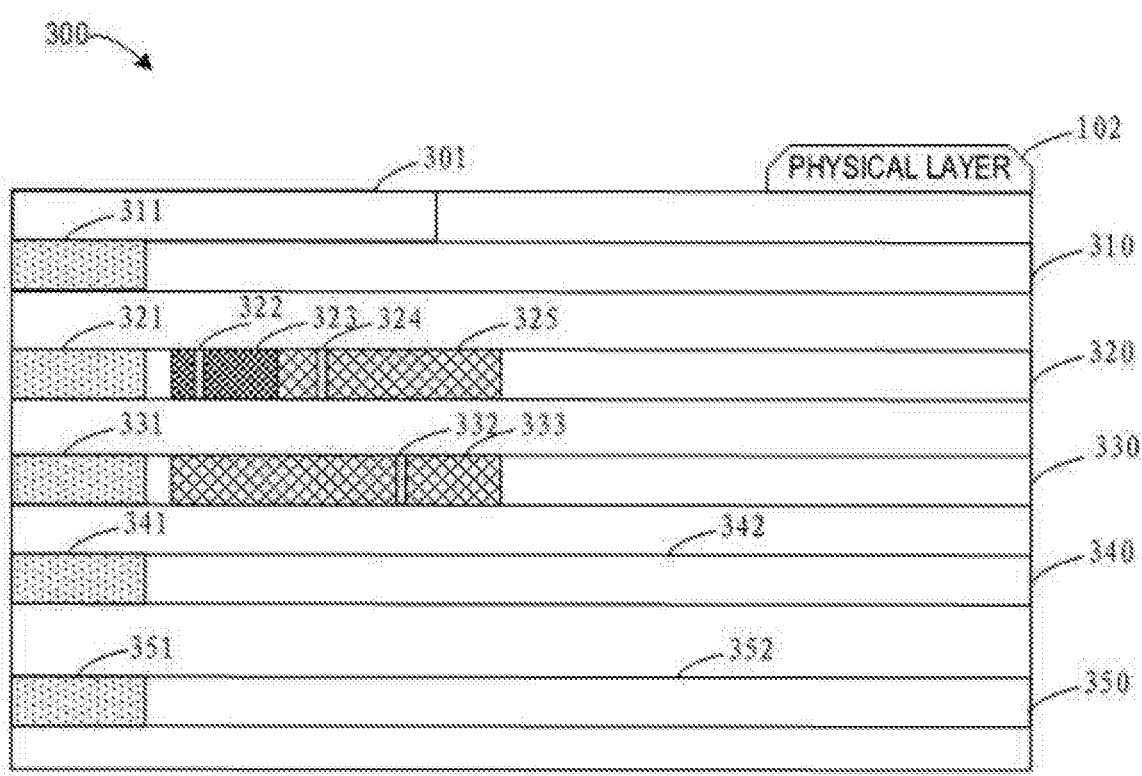
FIG. 3 illustrates a schematic diagram of metadata stored in each storage unit according to some embodiments of the present disclosure.

FIG. 3 illustrates a schematic diagram of metadata stored in each storage unit according to some embodiments of the present disclosure. For the ease of description, the term "storage unit" is usually replaced with the term "slice" in the following description. It is seen from FIG. 3 that the physical layer 102 comprises a plurality of storage units 110, comprising slices 310, 320, 330, 340 and 350, each slice having an identical size (e.g., 256 MB). The slices 320, 330, 340 and 350 therein have been allocated to the current logic storage unit. The beginning portion of each slice of 310-350 comprises a data field having the same size, in which metadata 311-351, referred to as "Slice Mark" 403, is stored. The Slice Mark is also known as file system information (FSINFO). From another aspect, each slice in the physical layer 102 can be classified as root slice 320/330 or data slice 340/350 by its purpose. However, the root slices can also be further classified as first root slice 320 and non-first root slice 330, wherein metadata of the so-called root slice map entry 323 and metadata of the so-called data slice map entry 325 are stored in the first root slice, and the non-first root slice only comprises metadata of the data slice map entry 333.

The above root slice map entry 323 and the data slice map entry 325/333 are collectively known as slice map entry (SME), which describes the mapping from the root slice to other slices in the physical layer 102. For example, the root slice map entry 323 in the first root slice 320 comprises an index 322 to another non-first root slice 330. With respect to the data slice map entry 325/333, it respectively comprises an index 324 to a data slice 340 and an index 332 to a further data slice 350. In terms of the data slice 340/350, it is known from FIG. 3 that besides the metadata 341/351 identifying the slice mark/file system information, the rest of storage space 342/352 serves as data storage space, and the data slice does not comprise the slice map entry SME inside. Furthermore, according to FIG. 3, metadata acting as a Slice Allocation Table (SAT) is also stored in the physical layer 120 except from the data area that has already been divided into slices. The SAT metadata records allocation status of all slices inside the disk.

In the physical layer 102, the metadata associated with slice allocation mainly comprises the above introduced three forms: slice allocation table (SAT) 301, slice map entry (SME) 323/325/333 and Slice Mark/File System Information (FSINFO). For ease of description, the above three types of metadata are denoted as SAT, SME and FSINFO. Although the three types of metadata differ in storage position, format and specific data content, they share one thing in common, i.e., all of them stores allocation information currently associated with status of storage units 110 allocated to the logic storage unit by the support layer 104. The current allocation status of the storage units 110 (SAT, SME and FSINFO) is stored in many copies in the storage system, enabling redundant storage and enhance fault tolerance of the storage system.

In one embodiment, if the storage system 100 discovers an error in the currently stored metadata, e.g., the allocation status of the storage unit 110 recorded in the multiple metadata is inconsistent, the storage system will perform a voting mechanism at this moment, i.e., reading each of the multiple metadata and selecting the majority metadata as the correct metadata. For example, if the current metadata is stored into three copies and the storage system discovers that one of the three is different from the other two, it will determine the correct metadata by performing the voting algorithm of 2:1.

Now return to block 230. After allocating the new storage unit 110, the storage system will update the above described metadata to record the latest allocation status of the storage units 110.

At block 240, the metadata is encrypted. Based on the above description, the traditional encryption technology first encrypts the data in the file and then writes the data into the disk. Therefore, if the disk is stolen or took away by someone and he/she does not know the decryption algorithm corresponding to the encryption algorithm or the encryption key, he/she cannot recover or identify the encrypted data. However, the traditional data encryption process costs a huge amount of computations, takes up a large amount of CPU operation costs and tends to lower the performance of the system.

Regarding the above problem, the inventor notices that in many circumstances, it is not actually required to encrypt the whole user data on the disk, e.g., when dealing with database file, important video/audio files and design drawing files and the like. Thus, the inventor proposes following improvements for the traditional data encryption method.

At block 240, the performed encryption operation is directed against the key metadata only, rather than the entire data. In this way, not only the security of data on the disk is protected, but also a better balance is acquired between data security and influence on system performance. This is because the metadata comprises information that describes how the system manages the storage space and the file system, according to the above description, and the metadata can be utilized to recover storage space of the system and file system.

If an encryption operation is performed on the metadata, it is apparent that other person cannot recover user data and/or file stored inside the storage system based on the metadata if they cannot restore the metadata. In another aspect, compared with the data amount of user data on the disk, the data amount of the metadata is usually quite small, e.g., occupying only about 1% of the total storage space. If the metadata is encrypted, the occupied CPU processing overhead is obviously quite small. Therefore, the entire encryption process exerts an extremely light, even unnoticeable, influence on the overall performance of the system.

In terms of the storage system 100 described by the present disclosure, the metadata selected for the encryption process is the metadata that reflects the allocation process and the mapping of the storage unit 110. The above metadata reflects the mapping from the support layer 104 to the physical layer 102. Each storage unit 110 (265 MB each in size, for example) in the physical layer 102 is allocated by a unit of chunk space, so the data amount of the metadata is relatively small due to the large scale, and the corresponding encryption does not demand a huge amount of computations. By contrast, the file system layer 106 (performing page management at the level of 8K) also has metadata corresponding to its internal mapping, while the present application chooses not to perform encryption on such metadata because the metadata reflecting the above mapping process is relatively huge in amount and complicated, and the encryption will cost more CPU resources, which will more obviously affect the working performance of CPU.

In some embodiments, the storage system 100 can encrypt, for example, three types of metadata, SAT, SME and FSINFO, as described above. Because each type of the metadata stores current information associated with status of storage units 110 allocated to the logic storage unit by the support layer 104, data security can be effectively improved after the encryption. As the metadata is encrypted, the others cannot recover the data content on the disk if they fail to acquire the corresponding decryption algorithm or key.

Based on the above description, the present application, as compared with the traditional encryption method, performs encryption on selected appropriate metadata. The present application protects the data security and achieves light weight encryption process simultaneously, so as to avoid affecting the system performance as much as possible and achieve a better balance therebetween. Such encryption operation has a very slight influence on CPU, which can significantly improve operation efficiency of CPU.

Considering another possible scenario: a certain person steals part or all of the disks from the disk array in the above described storage system 100, and inserts the stolen disks into a rack of a further storage system 100 of the same model. In the case that the data in the disk is not encrypted, logic storage unit, file system and data on the disk can be easily recovered in the further storage system. Furthermore, even if the user has already encrypted data in the disk in a certain manner, the further storage system of the same model can still recover the original logic storage unit and file system stored thereon if it is aware of the algorithm and/or key to decrypt the data. This is because the two storage systems share the same model, and usually run the same operating system software, therefore they share the same encryption and/or decryption algorithm.

To handle with the above defect, according to some embodiments, when the metadata is encrypted, the information associated with the hardware component of the storage system 100 can be employed as the encryption key to encrypt the metadata. Accordingly, the storage system 100 only needs to read the information associated with the hardware component of the current storage system during the encryption or decryption process. In the above case that the storage medium is stolen and installed into a further storage system of the same model, the decryption key cannot correctly match with the encryption key used for encrypting the metadata, because the decryption key employed for decryption is associated with the hardware component of the further storage system. That is, a binding relationship between the disks and the hardware component of a particular storage system is established by using the information associated with the hardware component of the storage system as the encryption/decryption key.

Thus, if a particular disk is transferred to other machines of the same model, the metadata on the particular disk cannot be recovered or read out on the other machines, because different machines of the same model have different information associated with the hardware component, such that file data contents on the particular disk cannot be recovered or read out, which further improves data security. As an additional advantage, by adopting this method, the entire encryption-decryption process spares user intervention and/or attention and is completed by the system per se, which improves user experience.

Additionally or alternatively, the identifier (ID) of the mainboard of the storage system can be selected to serve as the encryption key to encrypt the updated metadata. As different storage systems have different mainboard identifiers, the identifier of the mainboard may be an appropriate choice for performing encryption/decryption operation.

Additionally or alternatively, the system identification code, the rack identifier of the storage system 100 and other data associated with the hardware component can act as the encryption key.

Additionally or alternatively, the above encryption key can also be manually assigned by the user. In this way, the encryption process can be bound with a particular user.

Because the metadata associated with the allocation status of the storage unit 110 is stored into a plurality of copies, the above disclosed encryption process of the metadata cannot be performed merely on one of the copies of the metadata; if so, a malicious personnel can easily recover allocation information of the storage unit 110 from the unencrypted metadata. Therefore, every time a storage unit 110 is allocated, the above three types of metadata will be updated and encrypted together. As stated above, the encryption key uses the information associated with the hardware component of the current storage system, e.g., identifier of the mainboard. In this way, when the user allocates the first 256M storage unit 110, CPU encrypts the three types of metadata, and any data subsequently written into the storage unit 110 will not be encrypted. Besides, the next encryption will be performed only when the next 256M storage unit 110 is allocated, which exerts an extremely slight influence on the working performance of the CPU.

Figure 4:
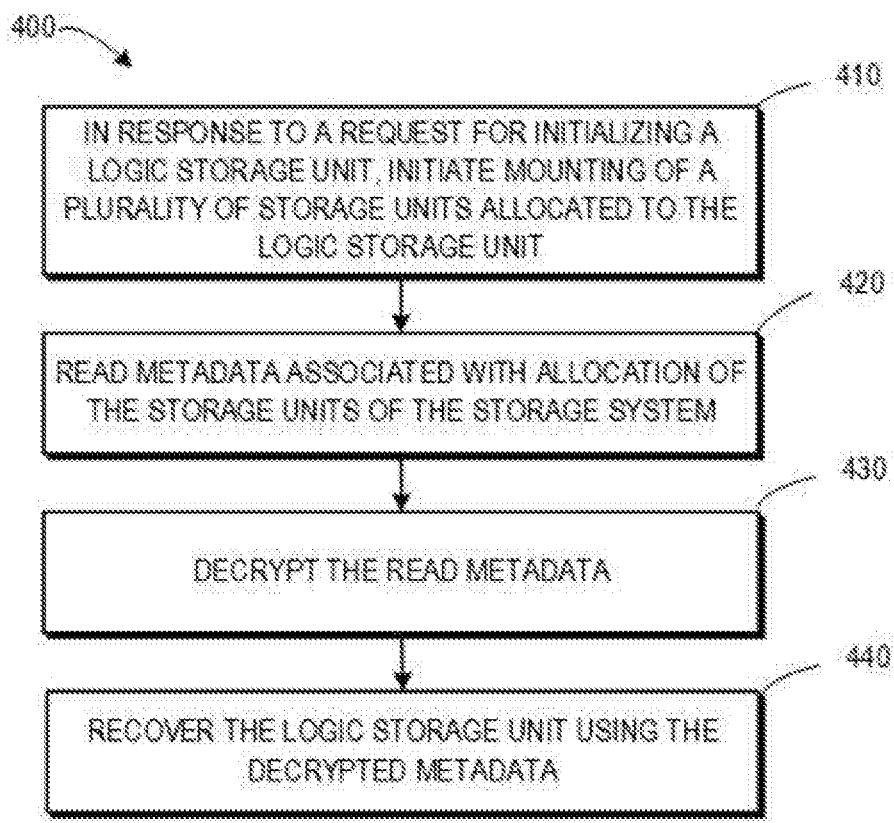
FIG. 4 illustrates a flow block diagram of a method 400 for managing a storage system according to a further embodiment of the present disclosure.

In terms of another aspect of the present disclosure, FIG. 4 illustrates a flow block diagram of a method 400 for managing a storage system according to a further embodiment of the present disclosure, which corresponds to the method for encrypting the metadata shown in FIG. 2.

At block 410, the storage system 100 initiates mounting a plurality of storage units that has been allocated to the logic storage unit, in response to a request for initializing the logic storage unit. Generally, the system does not need to perform the decryption operation during normal operation, because except for the encrypted current metadata stored in the physical layer 102 is with therein, the non-encrypted state of the above metadata also resides in the memory to facilitate reading, updating and using the metadata in real time by the storage system 100. The method 400 for decrypting metadata in the physical layer 102 is usually performed when the storage system 100 is reset after being powered down, crashed or collapsed. This is because the memory does not comprise the metadata at this moment, which requires reading metadata in the encrypted state from the physical layer 102. Therefore, at block 410, the storage system 100 receives a request for initializing the logic storage unit after powering up and resetting. To recover the logic storage unit, it requires initiating an operation of mounting a plurality of storage units corresponding to the logic storage unit, to reestablish a mapping from storage units to logical storage unit at each level.

At block 420, the storage system 100 reads encrypted metadata associated with the allocation of the storage unit 110 from the physical layer 102. In one embodiment, the storage system only reads a default type of metadata to simplify the operation, e.g., the storage system only reads SME from the disk and decrypts the SME. In another embodiment, the storage system can also read a plurality of types of metadata.

At block 430, a decryption operation is performed on the read metadata and the decryption operation can be conducted in a reverse manner of the encryption operation. In one embodiment, if the encryption operation uses the information associated with the hardware component in the storage system as the encryption key, the decryption operation also uses the same information for decryption. In one embodiment, the identifier of the mainboard of the current storage system, which is automatically acquired by the storage system 100, can serve as the decryption key for performing the decryption operation. In one embodiment, the system identification code, the rack identifier of the storage system 100, and other data associated with the hardware component can be used as the decryption key. In a further embodiment, a decryption key manually assigned by the user can also be used.

At block 440, the metadata, which is correctly decrypted, is used for recovering the logic storage unit. During the process, the information reflecting the mapping between the allocated multiple storage units 110 and the logic storage unit comprised in the metadata is read out and identified by the storage system 100, and the mapping between the logic storage unit and the plurality of allocated storage units 110 in the physical layer 102 can be recovered based on the above information, so as to complete reestablishment and recovery process of the storage system 100.

Figure 5:
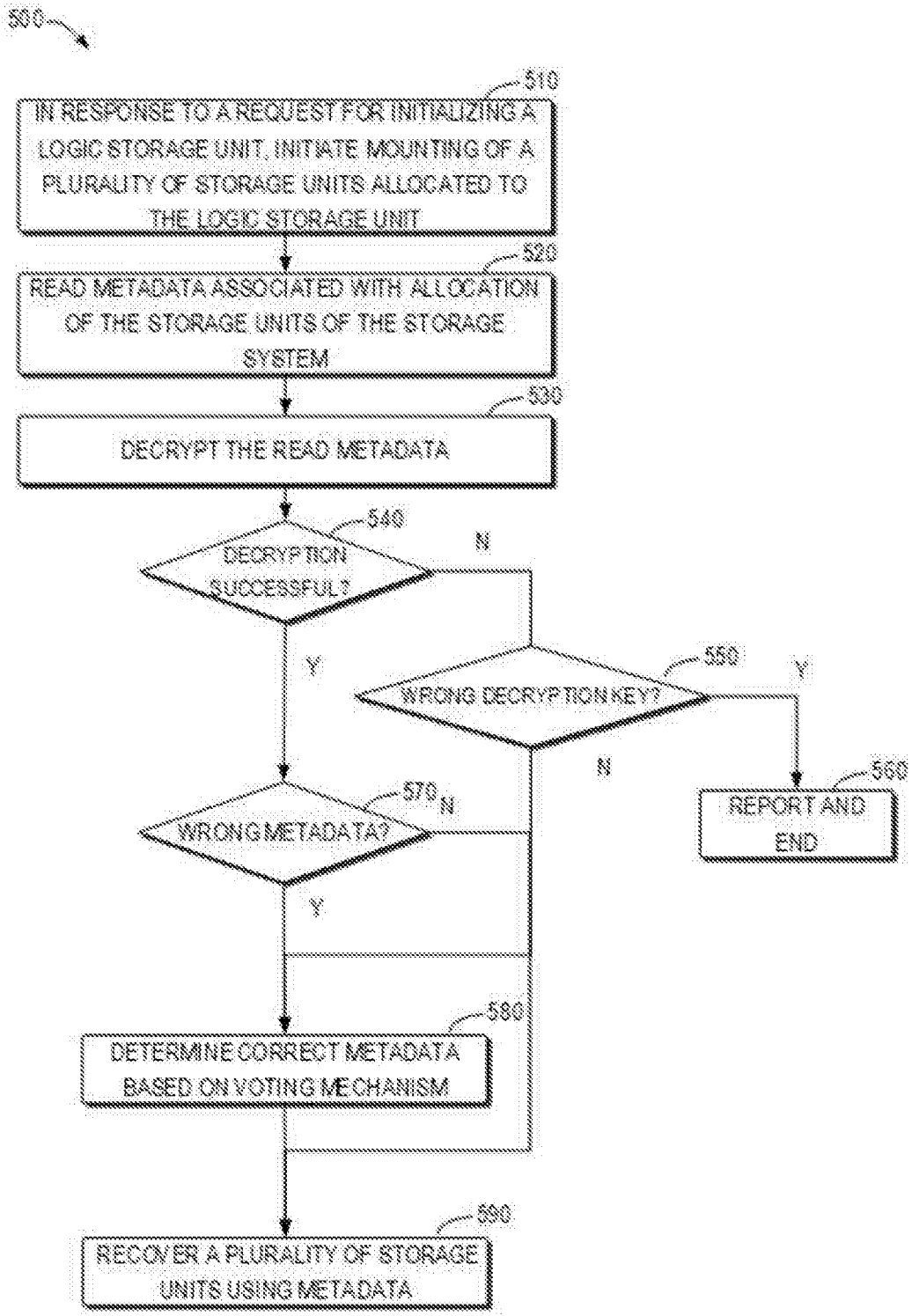
FIG. 5 illustrates a flow block diagram of specific steps of a method 500 for managing a storage system according to a further embodiment of the present disclosure.

FIG. 5 illustrates a flow block diagram of a method 500 for managing a storage system according to one embodiment of the present disclosure. In this embodiment, there is provided an error correction method during decryption when a metadata error is determined. By using this method, the correct metadata can still be effectively acquired even if the storage system determines errors in the metadata.

In FIG. 5, operations performed in blocks 510-530 correspond to FIG. 4 and will not be repeated here. After decrypting the metadata in block 530, the storage system 110 needs to determine, at block 540, whether the decryption operation on the currently retrieved metadata (e.g., SME by default) is performed successfully or not. If the decryption fails, it is probably due to the error of the decryption key and/or the error of the metadata per se. At this time, the storage system will go to block 550 to read all metadata associated with the allocation status of the storage units for decryption. If none of the metadata can be correctly decrypted at this moment, it means the decryption key is wrong and the system enters block 560, reports an error, and then ends the process.

If the previously extracted metadata is correctly decrypted, the storage system then enters the block 570 to perform a CRC check on the current data that has been correctly decrypted to determine whether an error occurs. If the current metadata is determined to be correct, the process enters the block 590, in which the storage system 100 recovers a plurality of storage units using the metadata and establishes a mapping in the storage device 100 to complete the initialization of the logic storage unit. However, if it is determined, at block 570, that the current metadata is successfully decrypted but goes wrong, the process enters the block 580, in which all of the remaining metadata is utilized to determine the correct metadata based on the voting mechanism.

If all of the remaining metadata is read out at block 550 and the decryption key is determined to be correct, the process also enters block 580, in which all of the remaining read metadata is utilized to determine the correct metadata based on the voting mechanism. The voting mechanism will be described in details in the following text. The correct metadata determined at the block 580 is then sent to the block 590 for recovering a plurality of storage units corresponding to the logic storage unit.

An example implementation of the voting mechanism is described below. The metadata can be divided into a plurality of copies (e.g., three copies) for separate storage. If the currently retrieved default metadata is determined to be wrong (cannot be correctly decrypted or the CRC check goes wrong), the storage system 100 will read out all of the remaining metadata and run decryption respectively. If both of the remaining metadata can be correctly decrypted, and the result is the same, the desired metadata may be determined based on the two copies of metadata. In another embodiment, if the remaining metadata is not completely the same after decryption, the desired metadata is determined from the above metadata based on the principle of simple majority. According to such voting algorithm, even if part of the metadata is discovered to be wrong and unusable, the desired correct metadata can still be determined based on the redundancy of the metadata and the voting algorithm to recover the storage system 100, thereby further enhancing stability and fault tolerance of the system.

It should be understood that the above described encryption method and decryption method can be performed successively in the same device, or can be performed separately by different devices. The present disclosure is not restricted in this regard.

Figure 6:
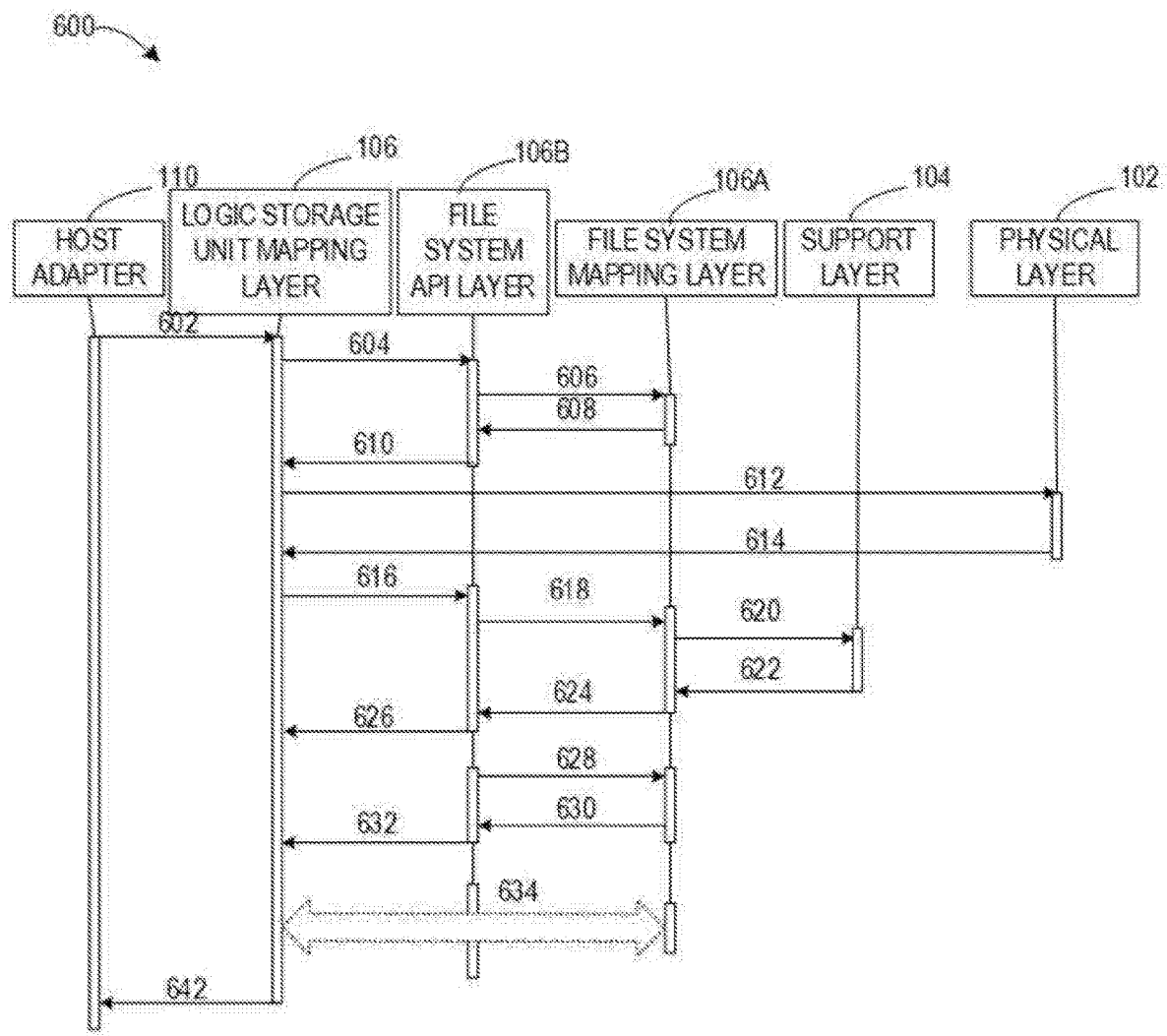
FIG. 6 illustrates a flowchart of a program 600 that indicates allocation of the storage unit and an encryption operation therein according to some embodiments of the present disclosure.

FIG. 6 illustrates a flowchart of a program 600 that indicates allocation of the storage unit and an encryption operation therein according to embodiments of the present disclosure. Now an internal interaction process of the storage device 100 is described from the perspective of function or program flow based on FIG. 6 with reference to FIGS. 1, 2 and 3.

As indicated in FIG. 6, the logic storage unit mapping layer 106 receives 602 a write request sent from a host adapter 110. The logic storage unit mapping layer 106 is used for controlling layers under it and performing an overall allocation control of the storage unit 110. Afterwards, the logic storage unit mapping layer 106 converts the above write request into an internal write command function, e.g., MFW( ) and sends 604 to the file system API layer 106B, which is an application programming interface of the file system layer 106. At the file system API layer 106B, the internal write command function MFW( ) is converted to a command function of the file system layer 106, such as getmapping( ) which is then sent 606 to the file system mapping layer 106A to determine whether the existing storage unit 110 satisfies the demand of the write operation. If yes, data is written into the currently allocated storage unit 110.

If the file system mapping layer 106A determines that the space of the currently allocated storage unit 110 does not satisfy the needs, a need for requesting a new storage unit 110 is indicated. Therefore, a request indicative of "a need for storage unit 110" is returned 608 to the file system API layer 106B and the internal state of the file system layer 106 is set to "pending." The file system API layer 106B forwards 610 the request of a need for storage unit 110 to the logic storage unit mapping layer 106. After receiving the request, the logic storage unit mapping layer 106 transmits 612 a command of allocating a new storage unit 110 to the physical layer 102. Upon receiving the command, the physical layer 102 allocates a new storage unit 110 and updates the slice allocation table (SAT) 301 to record the current allocation information of the storage unit 110. The modified SAT 301 can be encrypted subsequently.

After successfully allocating the storage unit 110, the physical layer 102 returns 614 "complete" to the logic storage unit mapping layer 106. The logic storage unit mapping layer 106 needs to allocate the storage unit 110 to the file system layer 106 after acquiring the storage unit 110. It should be noted that the file system layer 106 and the physical layer 102 are invisible to each other and the logic storage unit mapping 106 acts as a mediator for coordination. The logic storage unit mapping layer 106 transmits 616, to the file system API layer 106B, an indication for executing an action of adding a storage unit 110, which indication is transmitted 618, to the file system mapping layer 106A, via the file system API layer 106B. The file system mapping layer 106A initiates 620 the action of adding the storage unit 110 to the support layer 104. At this time, the storage unit 110 is successfully added into the support layer 104 corresponding to the file system layer 106. As the storage unit 110 is allocated to the support layer, the two metadata SME and FSINFO should be updated, and the encryption process can be performed subsequently on the two types of metadata.

The result of successful allocation of the storage unit 110 is then called back 622 to the file system mapping layer 106A, which transmits 624 a "complete" response to the file system API layer. The file system API layer then calls back 626 the result from the logic storage unit mapping layer 106. Meanwhile, the "pending" state in the file system layer 106 is removed and a "recovery" state is set. The file system API layer 106B initiates 628 a request to the file system mapping layer 106A of the position information of the storage unit 110 and then writes data into the position. When the write operation is completed, the file system mapping layer 106A returns 630 "complete." The internal command function "MFW ( )" sent at the corresponding step 604 is called back 632 to the logic storage unit mapping layer 106, which indicates the completion of the write operation. After that, the logic storage unit mapping layer 106 transmits an internal command to the file system layer 106 and establishes 634 an internal mapping associated the file system layer 106 with the previous written data. Finally, the logic storage unit mapping layer 106 transmits 642 a reply response to the host adapter 650, which indicates the completion of the task.

For the ease of description, the storage unit is allocated only once during the above interaction process. However, it can be understood that in fact, the allocation and encryption flow can be performed cyclically for several times, if the writing data is huge. That is, the following operation will be performed cyclically until the write operation is finally completed: the storage system, upon discovering that the newly allocated storage unit 110 is insufficient for the current write operation, will instruct to allocate a next new storage unit and add it into the logic storage unit.

In the above process, SAT is encrypted at 612 and SME and FSINFO are encrypted at 620. Those skilled in the art can understand that the encryption operations do not need to happen at each write operation and they are performed only when the current storage unit 110 is insufficient to satisfy the needs and is supplemented to the logic storage unit. That is, the encryption operation is performed every 256 MB bytes. Based on this solution, the computation amount generated by encrypting the storage system can be significantly reduced and the computational overheads of CPU can be greatly lowered.

Figure 7:
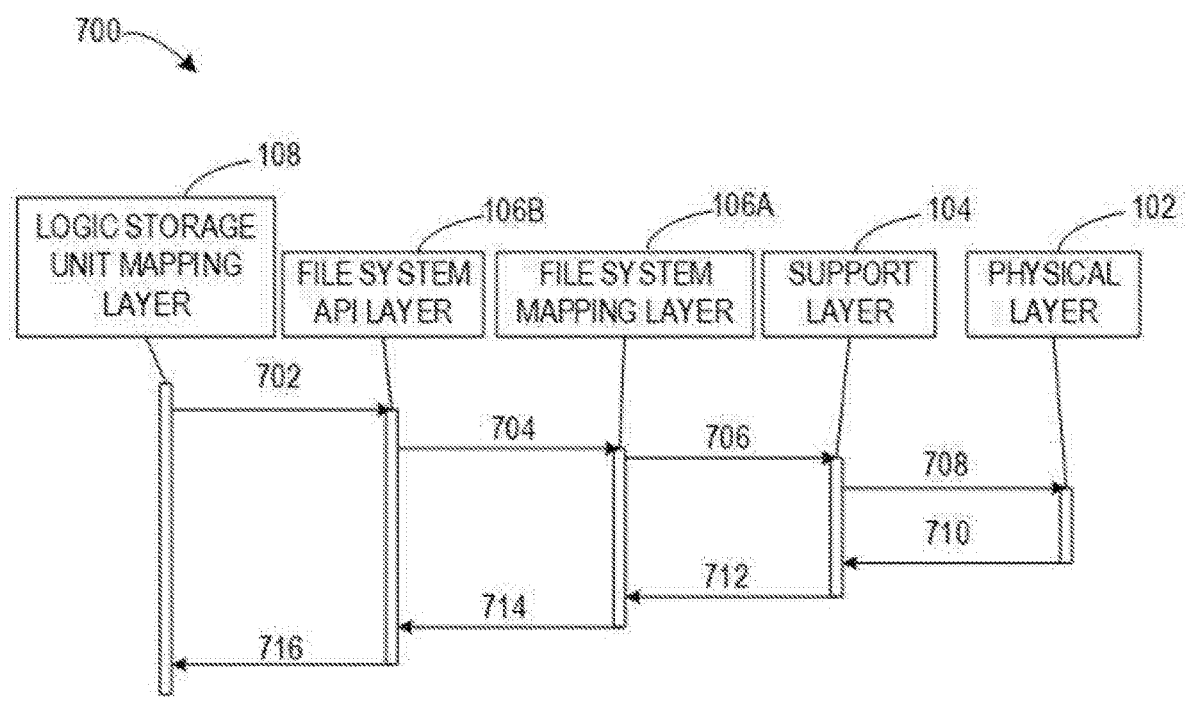
FIG. 7 illustrates a flowchart of a program 700 that indicates mounting of a storage unit and a decryption operation therein according to a further embodiment of the present disclosure.

FIG. 7 illustrates a flowchart of a program 700 that indicates mounting of a storage unit and a decryption operation therein according to a further embodiment of the present disclosure. A process of mounting the storage unit and an internal interaction process of a decryption operation therein will be described from the perspective of function or program flow based on FIG. 7 with reference to FIGS. 1, 4 and 5. It should be noted that the program flow 700 does not completely correspond to FIG. 5, and omits several steps to simplify the description.

When the storage system is powered on, the logic storage unit mapping layer 108 initiates 702 a mounting command while re-initializing the logic storage unit. The mounting command is transmitted 704 from the file system API layer 106B to the file system mapping layer 106A, which initiates 706 a command of building a volume to the support layer 104 and the metadata associated with allocation of the storage unit 110 is read from a disk. In one embodiment, SME stored on the disk is read out by default and decrypted to re-aggregate various storage units 110 that belong to a common logic storage unit. During the decryption process, the acquired information associated with the hardware component of the storage system serves as the decryption key, e.g., by using the identifier of the mainboard of the storage system as the decryption key. If the mainboard ID can match correctly, the decryption will succeed. If not, the decryption fails.

If an error occurs at this step (due to unsuccessful decryption or error in decryption result), the other two type of metadata (SAT and FSINFO) will be read 708 and decrypted. At this time, the voting mechanism is activated to determine which metadata is correct by comparison and then a "complete" response is returned 710 to the support layer 104. It can be appreciated that the operation of reading 708 and the operation of returning 710 will be performed only when the SME is determined to be wrong. Then, the support layer 104 returns 712 "complete" to the file system mapping layer 106A, which then returns 714 "complete" to the file system API layer. The file system API layer then returns 716 "complete" to the logic storage unit mapping layer. Accordingly, the flow of decryption process is relatively simple and is performed only when the system get started.

Although the voting mechanism is implemented only in the decryption step in the several specific implementations described above, those skilled in the art should understand that there is no restriction on when to use the voting mechanism. For example, during the operation of the storage system, as long as the system discovers that one of the plurality of copies of metadata stored on the current disk has an error, or the plurality of copies of data is not completely correspond to each other, or the metadata in the memory is mistaken, the voting mechanism can be employed to correct the errors in time. To sum up, the fault tolerance and stability of the storage system can be significantly improved via the redundancy of the metadata.

Besides, those skilled in the art should understand that the term "disk" appeared in each of the above embodiments is only for the purpose of description and does not necessarily refer to a hardware storage medium consisting of a magnetic storage medium in particular. Besides, it can also be implemented by SSD (solid-state hard disk), optical disk and the like among other mass storage media based on the requirements. Such storage medium can comprise magnetic storage media or materials, such as semiconductor material, circuit and optical storage media, etc.

Figure 8:
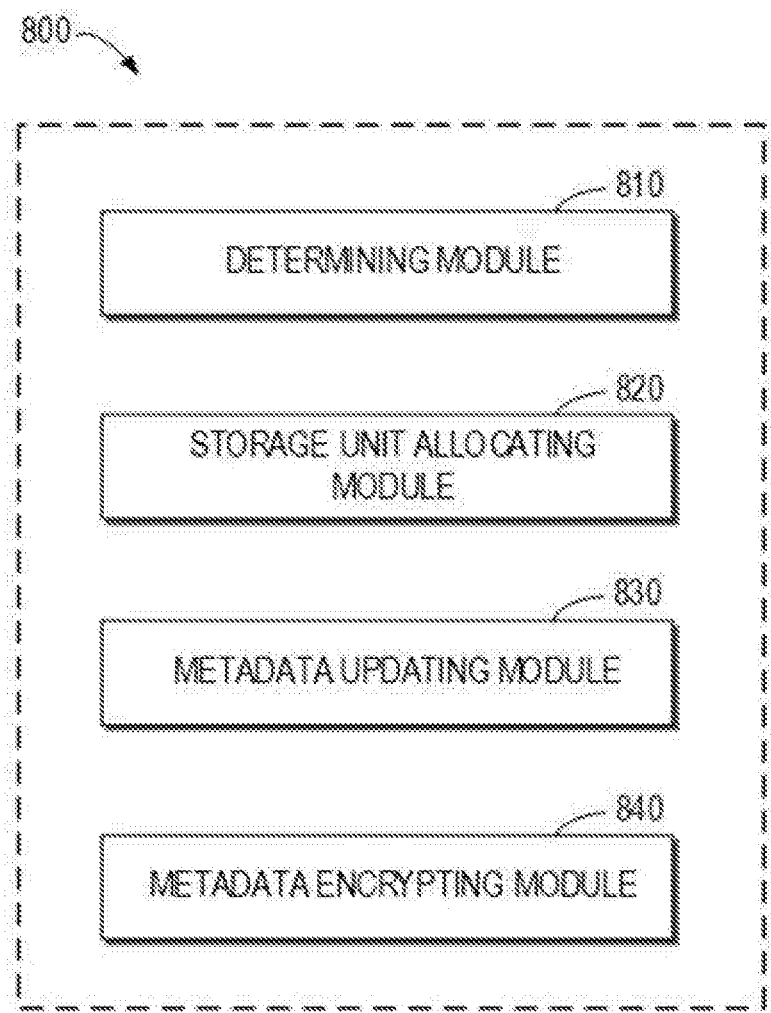
FIG. 8 illustrates a block diagram of a device 800 for managing the storage system according to embodiments of the present disclosure.

FIG. 8 illustrates a block diagram of a device 800 for managing the storage system according to embodiments of the present disclosure. The step flow 210-240 shown in FIG. 2 can be implemented by the device 800. According to FIG. 8, the device 800 comprises a determining module configured to determine the storage unit allocated to the logic storage unit of the storage system is sufficient for data associated with the write request, in response to receiving the write request at the storage system. The device 800 also comprises a storage unit allocating module configured to allocate a new storage unit to the logic storage unit, in response to determining the insufficiency of the allocated storage unit. The device 800 can also comprise a metadata updating module, which is configured to update metadata associated with the allocation of the storage units of the storage system, wherein the metadata indicates a mapping between the logic storage unit and the plurality of storage units. The device 800 can also comprise a metadata encrypting module configured to encrypt updated metadata.

Figure 9:
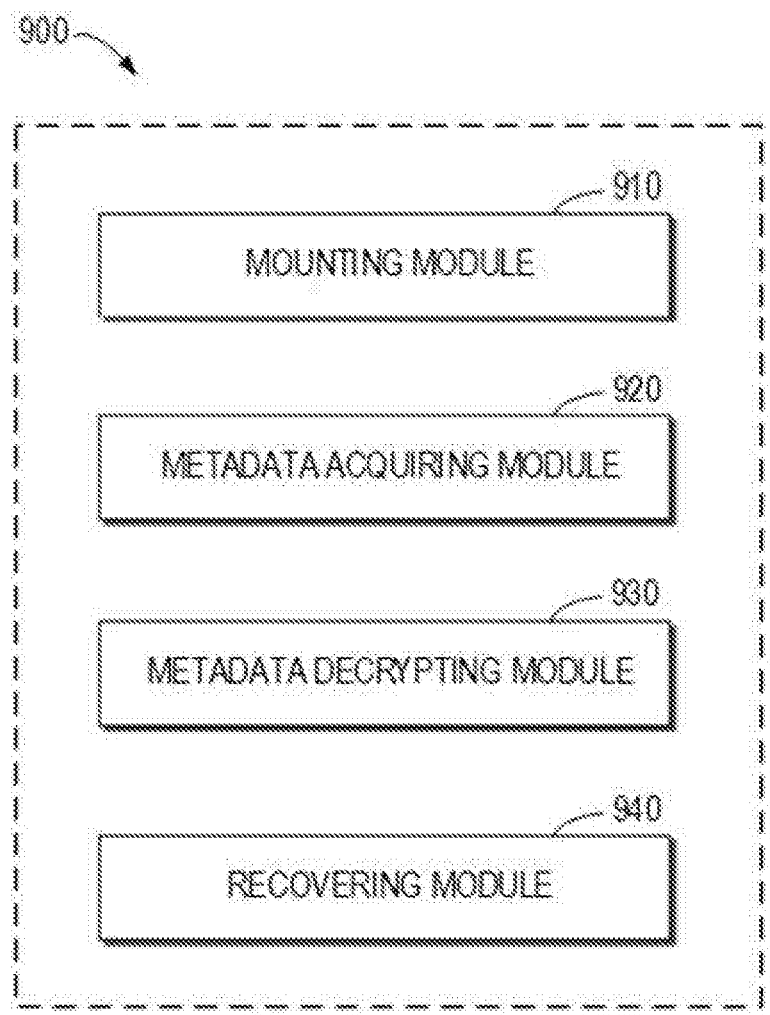
FIG. 9 illustrates a block diagram of a device 900 for managing the storage system according to a further embodiment of the present disclosure.

FIG. 9 illustrates a block diagram of a device 900 for managing a further embodiment of the storage system according to a further embodiment of the present disclosure. The step flow 410-440 shown in FIG. 4 can be implemented by the device 900. According to FIG. 9, the device 900 can comprise a mounting module configured to initiate an operation of mounting the plurality of storage units allocated to the logic storage unit in response to a request for initializing the logic storage unit. The device 900 can comprise a metadata acquiring module for reading metadata associated with allocation of the storage unit 110 of the storage system 100, wherein the metadata indicates a mapping between the logic storage unit and the plurality of storage units. The device 900 can comprise a decryption module for decrypting the read metadata. The device 900 can also comprise a recovery module for recovering the logic storage unit by means of the decrypted metadata.

Figure 10:
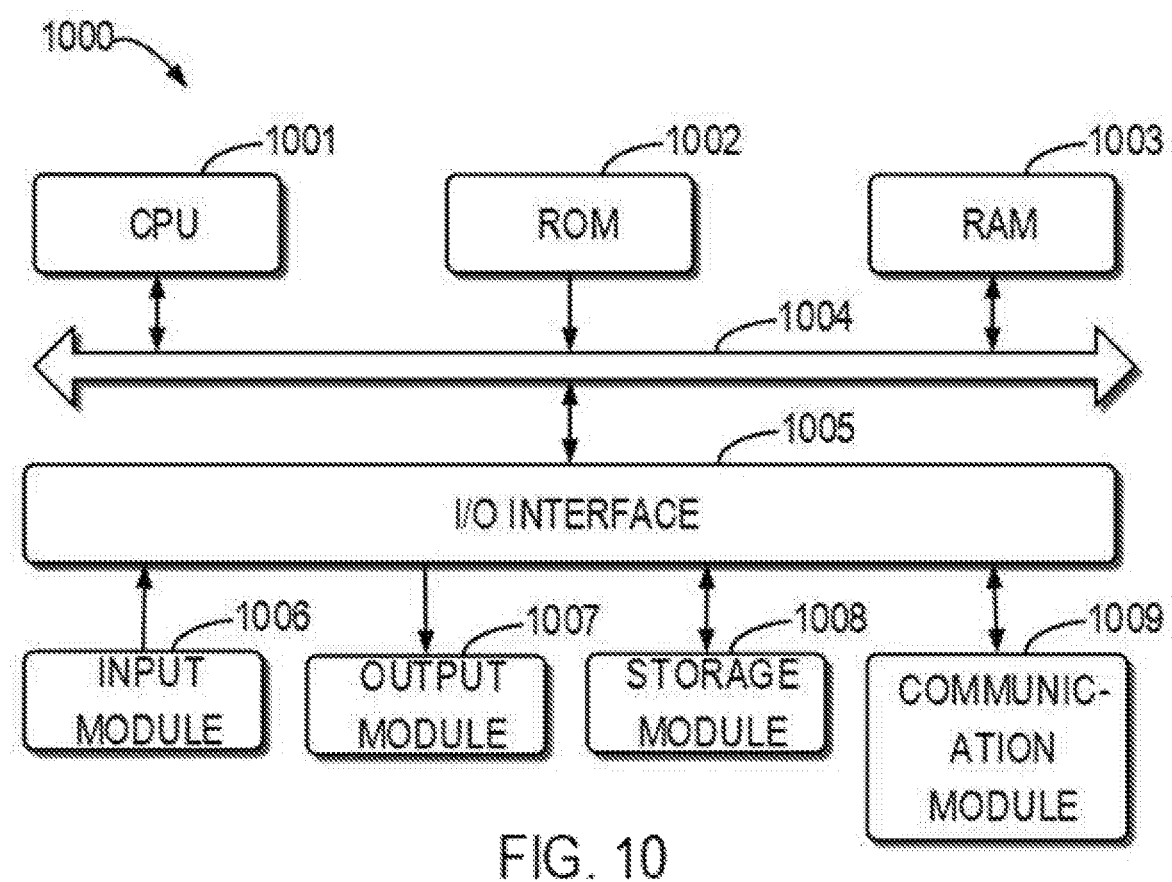
FIG. 10 illustrates a schematic block diagram of an example device 1000 for implementing some embodiments of the present disclosure.

FIG. 10 illustrates a schematic block diagram of an example device 1000 for implementing embodiments of the present disclosure. For example, any of the steps 210-240 shown in FIG. 2 and the steps 410-440 shown in FIG. 4 can be implemented by the device 1000. According to the drawing, the device 1000 comprises a central process unit (CPU) 1001, which can execute various actions and processing based on the computer program instructions stored in the read-only memory (ROM) 1002 or computer program instructions loaded in the random-access memory (RAM) 1003 from the storage module 1008. In the RAM 1003, it can also store all kinds of programs and data required by the operation of the device 1000. CPU 1001, ROM 1002 and RAM 1003 are connected to each other via bus 1004. The input/output (I/O) interface 1005 is also connected to the bus 1004.

A plurality of components in the device 1000 is connected to the I/O interface 1005, comprising: an input module 1006, such as keyboard, mouse and the like; an output module 1007, e.g., various kinds of display and loudspeakers etc.; a storage module 108, such as disk and optical disk etc.; and a communication module 1009, such as network card, modem, wireless transceiver and the like. The communication module 1009 allows the device 1000 to exchange information/data with other devices via the computer network, such as Internet, and/or various telecommunication networks.

The above described procedure and processing, such as method 200 and method 400, can be executed by the processing module 1001. For example, in some embodiments, the method 200 and the method 400 can be implemented as a computer software program tangibly comprised in the machine-readable medium, e.g., storage module 1008. In some embodiments, the computer program can be partially or fully loaded and/or mounted to the device 1000 via ROM 1002 and/or communication module 1009. When the computer program is loaded to RAM 1003 and executed by the CPU 1001, one or more actions of the above describe method 200 or 400 can be implemented.

Embodiments of the present disclosure relate to a method, device, system and/or computer program product. The computer program product can comprise a computer-readable storage medium, on which the computer-readable program instructions for executing various aspects of the present disclosure are stored.

The computer-readable storage medium can be a tangible device that maintains and stores instructions utilized by the instruction executing devices. The computer-readable storage medium can be, but not limited to, electrical storage device, magnetic storage device, optical storage device, electromagnetic storage device, semiconductor storage device or any appropriate combinations of the above. More specific examples of the computer-readable storage medium (non-exhaustive list) may comprise: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or bump structures in a groove, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can comprise copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages comprise object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, comprising local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described herein with reference to flow charts and/or block diagrams of method, apparatus (system) and computer program products according to embodiments of the present disclosure. It should be understood that each block of the flow charts and/or block diagrams and the combination of various blocks in the flow charts and/or block diagrams can be implemented by computer-readable program instructions.

The computer-readable program instructions can be provided to the processor of general-purpose computer, specific-purpose computer or other programmable data processing apparatuses to manufacture a machine, such that the instructions that, when executed by the processor of the computer or other programmable data processing apparatuses, generate an apparatus for implementing functions/actions stipulated in one or more blocks in the flow charts and/or block diagrams. The computer-readable program instructions can also be stored in the computer-readable storage medium and cause the computer, programmable data processing apparatus and/or other devices to work in a particular manner, such that the computer-readable medium stored with instructions comprises an article of manufacture, comprising instructions for implementing various aspects of the functions/actions stipulated in one or more blocks of the flow charts and/or block diagrams.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow charts and/or block diagrams.

Various implementations for implementing the method of the present disclosure have been described with reference to the drawings. Those skilled in the art can understand that the above method can be implemented by software or by hardware, or by the combinations of software and hardware. Besides, those skilled in the art can appreciate that a device based on the same inventive concept can be provided by implementing each step of the method by software, hardware or the combinations of software and hardware. Even if the device is the same as the general-purpose processing device in hardware structure, the device exhibits characteristics distinguished from the general-purpose processing device due to the function of the software comprised in the device, so as to form a device for various implementations of the present disclosure. The device in one embodiment of the present disclosure comprises several means or modules configured to execute respective steps. Those skilled in the art can understand how to write a program to implement actions executed by the means or modules by reading the description. Because the device and method are based on the same inventive concept, the same or corresponding implementation details therein are also applicable to the respective means or modules of the above method. As the above text has described it in a detailed and complete manner, the following text will not repeat it.

The flow charts and block diagrams in the drawings illustrate system architecture, functions and operations implemented by system, method and computer program product according to multiple implementations of the present disclosure. In this regard, each block in the flow chart or block diagram can represent a module, a program segment or a part of code, wherein the module, the program segment or the code comprise one or more executable instructions for performing stipulated logic functions. In some alternative implementations, it should be noted that the functions indicated in the block can also take place in an order different from the one indicated in the drawings. For example, two successive blocks can be actually executed in parallel or sometimes in a reverse order, based on the involved functions. It should also be noted that each block in the block diagram and/or flow chart and combinations of the blocks in the block diagrams and/or flow charts can be implemented by a hardware-based system exclusive for executing stipulated functions or actions, or by a combination of specific hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of terms in the text aims to best explain principles, actual applications of each embodiment and technical improvements made in the market by each embodiment, or enable those ordinary skilled in the art to understand embodiments of the present disclosure.

We claim:

1. A method of managing a storage system, comprising:
in response to receiving a write request at the storage system, determining whether storage units allocated to a logic storage unit of the storage system are sufficient for data associated with the write request, the storage system being used for allocating a plurality of storage units to a logic storage unit and providing the logic storage unit to a user, the plurality of storage units derived from a physical layer that provides storage units for allocation to a support layer, the storage system including at least one other layer above the support layer for providing the logic storage unit to the user;
in response to determining that the allocated storage units are insufficient, allocating a new storage unit to the logic storage unit;
updating metadata associated with allocation of the storage units of the storage system, the metadata indicating a mapping between the logic storage unit and the storage units; and
encrypting only a portion of the updated metadata, the portion associated with allocations of storage units from the physical layer to the support layer but excluding metadata in any layer above the support layer, wherein the support layer includes a sparse volume and a layer above the support layer includes a file system, and wherein the method further comprises selectively accessing data of the logic storage unit based on decrypting the encrypted portion of metadata and recovering therefrom a mapping between the logic storage unit and the plurality of allocated storage units,
wherein encrypting the updated metadata comprises encrypting the updated metadata by using information associated with a hardware component of the storage system as an encryption key.

2. The method of claim 1, wherein the information associated with the hardware component includes
an identifier of a mainboard of the storage system.

3. The method of claim 1, wherein the metadata indicates at least one of: a storage unit map entry, a storage unit mark, file system information, and a storage unit allocation table.

4. The method of claim 1, further comprising:
in response to a request for initializing the logic storage unit, initiating mounting of the plurality of storage units allocated to the logic storage unit;
reading the metadata associated with allocation of the storage units of the storage system;
decrypting the encrypted portion of the read metadata; and
recovering the logic storage unit using the decrypted metadata.

5. The method of claim 4, wherein decrypting the read metadata comprises:
decrypting the read metadata by using the information associated with the hardware component of the storage system as a decryption key.

6. The method of claim 4, wherein the metadata comprises a plurality of data items, and recovering the logic storage unit using the decrypted metadata comprises:
in response to determining at least one of the plurality of data items being incorrect, selecting a correct data item from the plurality of data items based on a voting mechanism.

7. The method of claim 4, wherein the metadata is selected from at least one of: a storage unit map entry, a storage unit mark, file system information, and a storage unit allocation table.

8. The method of claim 1, wherein the file system includes file system mapping metadata for providing the logic storage unit to the user, and wherein encrypting only the portion of the updated metadata excludes the file system mapping metadata.

9. The method of claim 8, wherein the at least one other layer above the support layer further includes a logic storage unit mapping layer that includes metadata for providing the logic storage unit to the user, and wherein encrypting only the portion of the updated metadata excludes metadata in the logic storage unit mapping layer.

10. The method of claim 8, wherein encrypting the portion of the updated metadata includes encrypting a slice map entry (SME) that describes mapping relationships among logic units in the physical layer.

11. The method of claim 1, wherein encrypting the portion of the updated metadata obscures user data without requiring encryption of the user data.

12. An electronic device, comprising:
at least one processor; and
a memory coupled to the at least one processor, the memory comprising instructions stored thereon, which, when executed on the at least one processor, cause the device to perform acts comprising:
in response to receiving a write request at the storage system, determining whether storage units allocated to a logic storage unit of the storage system are sufficient for data associated with the write request, the storage system being used for allocating a plurality of storage units to a logic storage unit and providing the logic storage unit to a user, the plurality of storage units derived from a physical layer that provides storage units for allocation to a support layer, the storage system including at least one other layer above the support layer for providing the logic storage unit to the user;
in response to determining that the allocated storage units are insufficient, allocating a new storage unit to the logic storage unit;
updating metadata associated with allocation of the storage units of the storage system, the metadata indicating a mapping between the logic storage unit and the storage units; and
encrypting only a portion of the updated metadata, the portion associated with allocations of storage units from the physical layer to the support layer but excluding metadata in any layer above the support layer,
wherein the support layer includes a sparse volume and a layer above the support layer includes a file system, and wherein the acts further comprise selectively accessing data of the logic storage unit based on decrypting the encrypted portion of metadata and recovering therefrom a mapping between the logic storage unit and the plurality of allocated storage units, and wherein encrypting the updated metadata comprises encrypting the updated metadata by using information associated with a hardware component of the storage system as an encryption key.

13. The device of claim 12, wherein the information associated with the hardware component includes an identifier of a mainboard of the storage system.

14. The device of claim 12, wherein the metadata indicates at least one of:

a storage unit map entry, a storage unit mark, file system information, and a storage unit allocation table.

15. A computer program product including a set of non-transitory, computer-readable media having instructions which, when executed by control circuitry of a computerized apparatus, cause the computerized apparatus to perform a method of managing a storage system, the method comprising:

in response to receiving a write request at the storage system, determining whether storage units allocated to a logic storage unit of the storage system are sufficient for data associated with the write request, the storage system being used for allocating a plurality of storage units to a logic storage unit and providing the logic storage unit to a user, the plurality of storage units derived from a physical layer that provides storage units for allocation to a support layer, the storage system including at least one other layer above the support layer for providing the logic storage unit to the user;

in response to determining that the allocated storage units are insufficient, allocating a new storage unit to the logic storage unit;

updating metadata associated with allocation of the storage units of the storage system, the metadata indicating a mapping between the logic storage unit and the storage units; and encrypting only a portion of the updated metadata, the portion associated with allocations of storage units from the physical layer to the support layer but excluding metadata in any layer above the support layer, wherein the support layer includes a sparse volume and a layer above the support layer includes a file system, and wherein the method further comprises selectively accessing data of the logic storage unit based on decrypting the encrypted portion of metadata and recovering therefrom a mapping between the logic storage unit and the plurality of allocated storage units, wherein encrypting the updated metadata comprises encrypting the updated metadata by using information associated with a hardware component of the storage system as an encryption key.

16. The computer program product of claim 15, wherein the information associated with the hardware component includes an identifier of a mainboard of the storage system.

17. The computer program product of claim 15, wherein the metadata indicates at least one of: a storage unit map entry, a storage unit mark, file system information, and a storage unit allocation table.

18. The computer program product of claim 15, wherein the method further comprises:

in response to a request for initializing the logic storage unit, initiating mounting of the plurality of storage units allocated to the logic storage unit;

reading the metadata associated with allocation of the storage units of the storage system;

decrypting the encrypted portion of the read metadata; and recovering the logic storage unit using the decrypted metadata.

19. The computer program product of claim 18, wherein decrypting the read metadata comprises decrypting the read metadata by using the information associated with the hardware component of the storage system as a decryption key.

20. The computer program product of claim 18, wherein the metadata comprises a plurality of data items, and recovering the logic storage unit using the decrypted metadata comprises:

in response to determining at least one of the plurality of data items being incorrect, selecting a correct data item from the plurality of data items based on a voting mechanism.

* * * * *